(12) United States Patent
Ishii et al.

(10) Patent No.: US 6,825,797 B2
(45) Date of Patent: Nov. 30, 2004

(54) RADAR SYSTEM

(75) Inventors: Toru Ishii, Hirataka (JP); Motoi Nakanishi, Nagaokakyo (JP); Tetsu Nishimura, Nagaokakyo (JP)

(73) Assignee: Murata Manufacturing Co, Ltd., Kyoto (JP)

( * ) Notice: Subject to any disclaimer, the term of this patent is extended or adjusted under 35 U.S.C. 154(b) by 0 days.

(21) Appl. No.: 10/388,531

(22) Filed: Mar. 17, 2003

(65) Prior Publication Data

US 2003/0184470 A1 Oct. 2, 2003

(30) Foreign Application Priority Data

Apr. 1, 2002 (JP) ......................................... 2002-099325

(51) Int. Cl.⁷ .......................... G01S 13/00; G01S 13/08; G01S 13/58
(52) U.S. Cl. .......................... 342/70; 342/107; 342/128; 342/145
(58) Field of Search .......................... 342/70, 128–132, 342/107–108, 145, 95, 174, 98; 340/992, 435–6; 180/167–169; 701/96, 223, 301

(56) References Cited

U.S. PATENT DOCUMENTS

| | | | | |
|---|---|---|---|---|
| 4,107,679 A | * | 8/1978 | Strauch et al. ................. 342/87 |
| 4,201,986 A | * | 5/1980 | Ducrocq ...................... 342/100 |
| 5,751,240 A | | 5/1998 | Fujita et al. |
| 6,225,941 B1 | * | 5/2001 | Gogineni et al. ............. 342/22 |

FOREIGN PATENT DOCUMENTS

| | | |
|---|---|---|
| EP | 0 501 566 A1 | 9/1992 |
| EP | 0 573 321 A1 | 12/1993 |
| JP | 08-304532 | 11/1996 |
| JP | 10115677 | * 10/1998 |
| JP | 11-271428 | 10/1999 |
| JP | 2001-174548 | 6/2001 |

* cited by examiner

Primary Examiner—Bernarr E. Gregory
Assistant Examiner—Brian Andrea
(74) Attorney, Agent, or Firm—Keating & Bennett, LLP

(57) ABSTRACT

A radar system achieves adjustment of a time-change characteristic of a frequency-modulating voltage signal to a voltage-controlled oscillator for determining a transmitting signal such that the time-change characteristic of the frequency-modulating voltage signal is changed by a minute amount and the frequency spectrum of a beat signal is determined. The adjustment is performed so that the shape of a bulge in signal intensity included in the frequency spectrum is the sharpest.

19 Claims, 9 Drawing Sheets

RADAR SYSTEM

BACKGROUND OF THE INVENTION

1. Field of the Invention

The present invention relates to a radar system that detects a target by using radio waves.

2. Description of the Related Art

A frequency-modulating continuous-wave (FM-CW) radar system has been developed as an in-vehicle radar system which is provided in a moving body such as a vehicle and which detects another vehicle, a person, an obstacle, or other object.

The FM-CW radar system transmits a frequency-modulated CW signal as a transmitting signal. It generates a beat signal by mixing the transmitting signal and a reception signal generated such that the transmitting signal is reflected by a target. It detects a relative position to the target and its relative speed based on the frequency of the beat signal.

A voltage-controlled oscillator (VCO) in which an oscillating frequency varies with a control voltage is used as a circuit for generating the transmitting signal. The relationship between the control voltage and oscillating frequency of the VCO is known beforehand. Thus, by controlling the control voltage supplied to the VCO, desired frequency modulation can be performed.

The characteristics of the oscillating frequencies of VCOs to the control voltages thereof are not always identical but have differences.

Regarding the above point, there are the following three related documents. (1) Japanese Unexamined Patent Application Publication No. 8-304532 discloses that the period of a triangular-waveform control voltage supplied to a VCO is divided into n intervals and two intervals among them are sequentially selected for triangular waveform correction. (2) Japanese Unexamined Patent Application Publication No. 11-271428 discloses that correcting data is obtained by comparing frequency spectra in n divisional intervals. (3) Japanese Unexamined Patent Application Publication No. 2001-174548 discloses that frequency modulation characteristics are measured by performing fast Fourier transform (FFT) processing in the portion of a modulation interval, extracting beat frequencies in a plurality of intervals, and transforming nonlinear distortion in numerical form based on the beat frequencies.

A radar system in any of the above-described documents (1), (2), and (3) uses a modulation method different from that used in an actual detection operation because correction is performed by using n divisional modulation intervals. Thus, it is impossible to perform correction in a form in which, while an actual detection operation is being performed, correcting data is simultaneously acquired.

Changes in characteristics of radar-system components, in particular, time-change characteristics (proportional to time or years) of a frequency-modulating voltage signal, have not been taken into consideration. Accordingly, it is impossible to cope with changes in characteristics occurring after shipping the radar system from a factory or after installing the radar system in an object such as a vehicle. In addition, in connection with the changes with time, malfunctions or other problems with the radar-system components cannot be detected.

SUMMARY OF THE INVENTION

In order to overcome the problems described above, preferred embodiments of the present invention provide a radar system in which time-change characteristics of a frequency-modulating voltage signal can be adjusted not only at the time of shipment from a factory, but also after shipment, that is, in an actual state of use.

According to a preferred embodiment of the present invention, a radar system includes a transmitting/receiving unit for transmitting, by supplying a frequency-modulating voltage signal to a voltage-controlled oscillator for determining a transmitting frequency, a transmitting signal in which an up-modulating interval having an upwardly shifting frequency and a down-modulating interval having a downwardly shifting frequency are alternately repeated, and for receiving a reflected signal from a target; a frequency-analyzing unit for finding data concerning the frequency spectrum of a beat signal based on the transmitting signal and the received signal; a detected-data extracting unit for extracting, based on the beat signal in the up-modulating interval and the beat signal in the down-modulating interval, at least one of a relative distance to the target and a relative speed of the target; and a time-change-characteristic adjustment unit for finding an evaluation value for evaluating the linearity of a frequency change in the transmitting signal from the result of the analysis by the frequency-analyzing unit, with a time-change characteristic of the frequency-modulating voltage signal changed by a minute amount, and for adjusting the time-change characteristic so that the evaluation value is optimal.

Preferably, the radar system of preferred embodiments of the present invention may include a warning output unit for outputting a warning when the amount for optimizing the evaluation value of adjusting the time-change characteristic of the frequency-modulating voltage signal exceeds a predetermined value.

In the radar system of preferred embodiments of the present invention, the time-change characteristic of the frequency-modulating voltage signal may be expressed by a polynomial of the second or higher order, and the time-change characteristic of the frequency-modulating voltage signal may be adjusted by changing the coefficient of each term of the polynomial.

According to preferred embodiments of the present invention, when adjustment is performed, a time-change characteristic of a frequency-modulating voltage signal is adjusted so that an evaluation value obtained based on the result of a frequency analysis by changing the time-change characteristic by a minute amount is optimal. Thus, the adjustment can be performed in a normal target-detecting operation.

The time-change characteristic of the frequency-modulating voltage signal is adjusted based on a beat signal caused by reflection from the target as one to be detected. Thus, in a factory, etc., it is not necessary to dispose a special target for characteristic adjustment or to connect an apparatus for characteristic adjustment. Accordingly, the adjustment can be performed in an actual state of use.

According to preferred embodiments of the present invention, in optimizing an evaluation value, when the amount of adjusting a time-change characteristic of a frequency-modulating voltage signal exceeds a predetermined value, data representing the state can be output. Therefore, a time change (year change) of a VCO can be detected, thus facilitating maintenance.

According to preferred embodiments of the present invention, a time-change characteristic of a frequency-modulating voltage signal is expressed by a polynomial of the second or higher order, and the time-change characteristic of the frequency-modulating voltage signal can be adjusted by changing the coefficient of each term. Thus, a smaller number of parameters can represent the time-change characteristic of the frequency-modulating voltage signal, and enables size and cost reduction of the entire apparatus without increasing the required memory capacity.

Other features, elements, characteristics and advantages of the present invention will become more apparent from the following detailed description of preferred embodiments thereof with reference to the attached drawings.

DETAILED DESCRIPTION OF PREFERRED EMBODIMENTS

A radar system according to a preferred embodiment of the present invention and a characteristic adjustment method therefor are described below with reference to the accompanying drawings.

Figure 1:
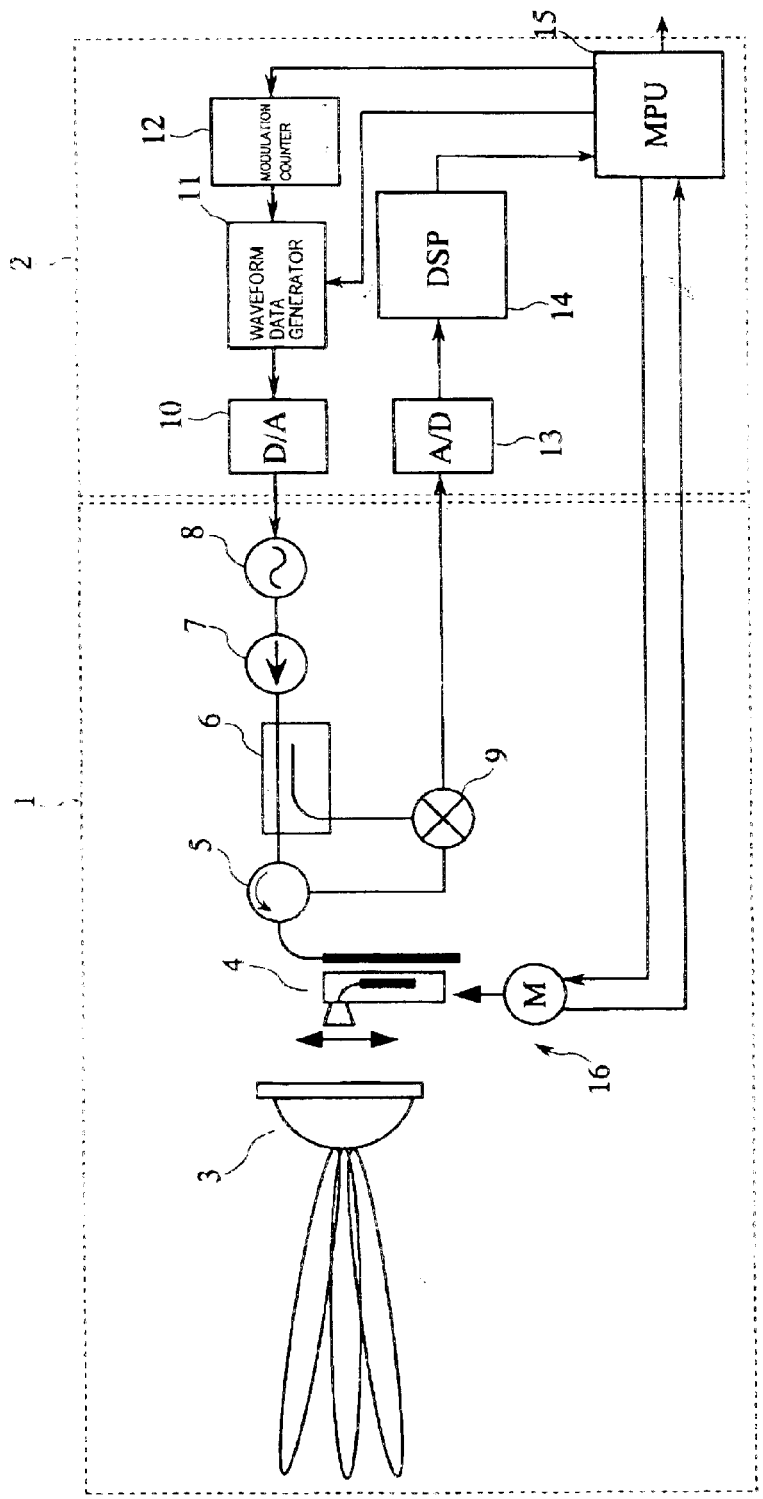
FIG. 1 is a block diagram showing the structure of a radar system.

FIG. 1 is a block diagram showing the structure of a radar system. The radar system includes a radio frequency (RF) block 1 and a signal processing block 2. The RF block 1 transmits and receives radio waves for detection using radar. The RF block 1 corresponds to a transmitting/receiving unit according to a preferred embodiment of the present invention. The RF block 1 outputs, to the signal processing block 2, a beat signal generated based on a transmitting signal and a reception signal. A modulation counter 12 in the signal processing block 2 changes a count value in triangular form under control of a microprocessor unit (MPU) 15. A waveform data generator 11 outputs, to a digital-to-analog (D/A) converter 10, an output value based on an output value supplied from the modulation counter 12 and parameters ($\alpha$, b, and c described later) from the microprocessor unit 15 which are required to monotonously change an oscillating frequency in an up-modulating interval and a down-modulating interval. The D/A converter 10 converts the output value from the waveform data generator 11 into an analog signal, and supplies the analog signal to a VCO 8 in the RF block 1. As a result, the VCO 8 generates an oscillating signal that is FM-modulated in triangular waveform.

The oscillating signal from the VCO 8 is supplied to a primary radiator 4 through an isolator 7, a coupler 6, and a circulator 5. The primary radiator 4 is positioned in the focal plane of a dielectric lens 3 or in the vicinity thereof. The dielectric lens 3 transmits, as a sharp beam, a millimeter-wave signal radiated by the primary radiator 4. When reflected waves from a target are incident as a received signal on the primary radiator 4 through the dielectric lens 3, the received signal is led to the mixer 9 through the circulator 5. The received signal and a local signal that is a portion of the transmitting signal are input to the mixer 9. A beat signal that is a frequency signal representing the difference between the received signal and the local signal is output as an intermediate frequency signal from the mixer 9 to the A/D converter 13 in the signal processing block 2. The A/D converter 13 converts the beat signal into digital data. A digital signal processor (DSP) 14 corresponds to a frequency analyzing unit according to a preferred embodiment of the present invention. The DSP 14 finds the frequency spectrum of the beat signal by performing FFT processing on a data stream input from the A/D converter 13.

The MPU 15 corresponds to a detected-data extracting unit according to a preferred embodiment of the present invention. The MPU 15 calculates a relative distance to the target and its relative speed, and outputs the calculated relative distance and speed to a host apparatus. The MPU 15 also corresponds to a time-change-characteristics adjustment unit. The MPU 15 supplies the waveform data generator 11 with parameters for generating waveform data.

A portion of the RF block 1 which is denoted by reference numeral 16 is a scan unit that controls the primary radiator 4 to travel in the focal plane of the dielectric lens 3 or in a plane parallel thereto. A movable unit provided with the primary radiator 4 and a fixed unit constitute a 0-dB coupler. The portion M indicates a motor for driving the movable unit.

Figure 2:
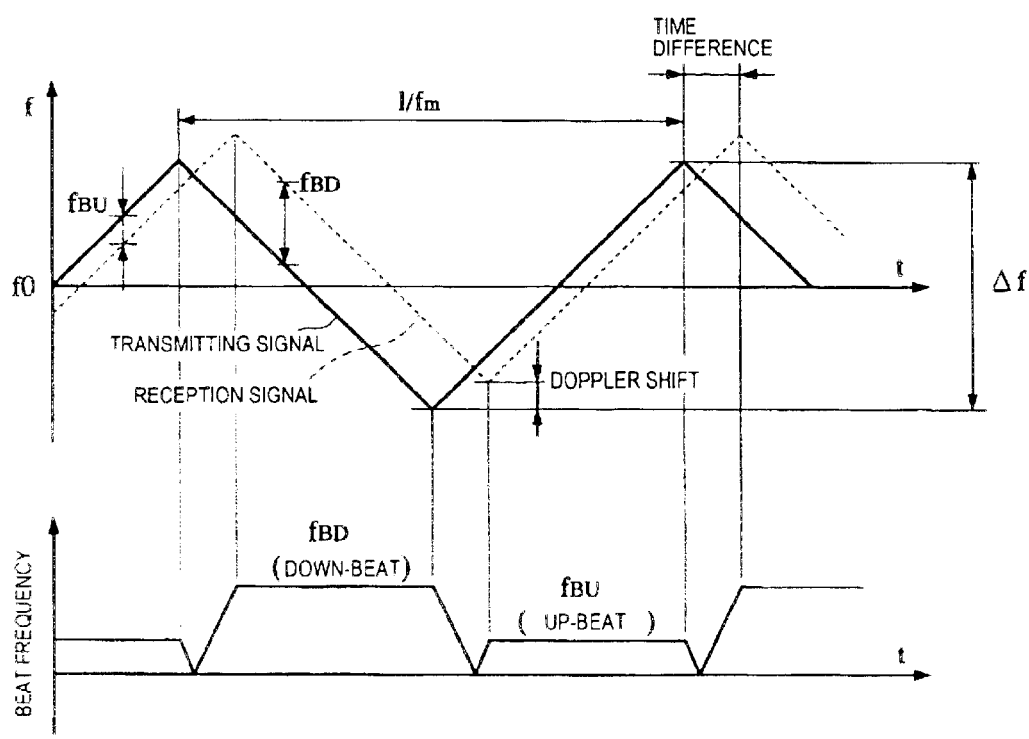
FIG. 2 includes graphs showing an example of frequency changes in a transmitting signal and a reception signal which are changed by a relative distance to a target and its relative speed.

FIG. 2 shows an example of a frequency change between a transmitting signal and a reception signal which is caused by a distance to a target and its relative speed. A frequency difference between the transmitting signal and the reception signal in an up-modulating interval of the transmitting signal is an up-beat frequency $f_{BU}$. A frequency difference between the transmitting signal and the reception signal in a down-modulating interval of the transmitting signal is a down-beat frequency $f_{BD}$. A shift (time difference) in time domain (time axis) of the triangular waves of the transmitting signal and the reception signal corresponds to a time in which the radio waves are sent from the antenna and return to the antenna. A shift in frequency domain (frequency axis) of the transmitting signal and the reception signal is a Doppler shift amount. This is caused by a relative speed of the target with respect to the antenna. This time difference and the Doppler shift amount change the values of up-beat frequency $f_{BU}$ and down-beat frequency $f_{BD}$. In other words, by detecting the up-beat and down-beat frequencies, the distance from the radar system to the target and its relative speed to the radar system are calculated.

Figure 3:
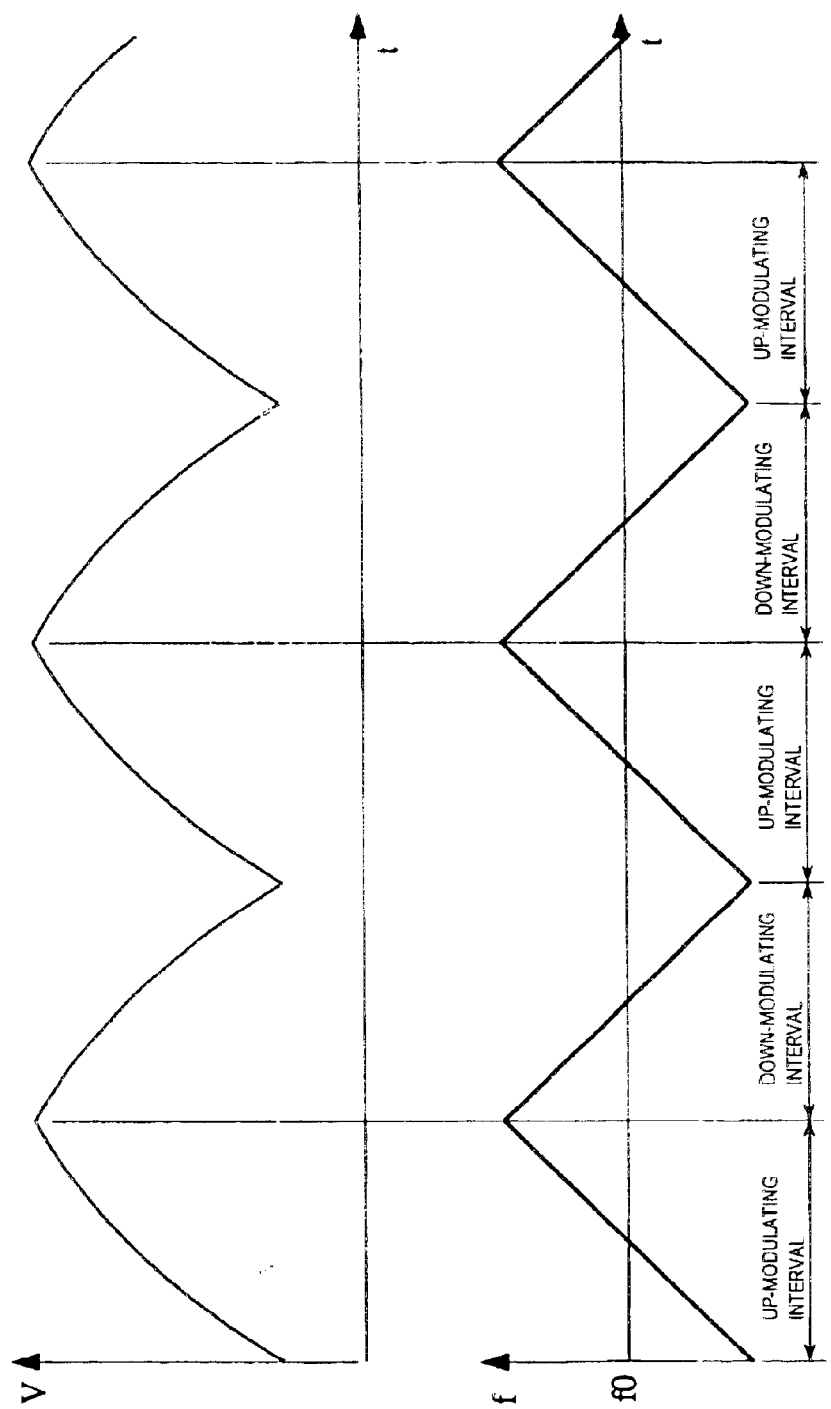
FIG. 3 includes graphs showing a relationship between a time-change characteristic of a frequency-modulating voltage signal and frequency modulation of a transmitting signal.

FIG. 3 shows a relationship between a time-change characteristic of a frequency-modulating voltage signal to the VCO 8 and a time-change characteristic of a transmitting frequency. In FIG. 3, the horizontal axes indicate time, "V" on the vertical axis indicates a frequency-modulating voltage signal to the VCO 8, and "f" on the vertical axis indicates an oscillating frequency. On the principle of the FM-CW radar, the oscillating signal of the VCO 8 must be frequency-modulated in triangular waveform. However, normally, the frequency-modulating voltage signal to the VCO 8 and its oscillating frequency cannot be expressed by a linear expression. As shown in FIG. 3, the time-change characteristic of the frequency-modulating voltage signal does not have any exact triangular waveform.

Figure 4:
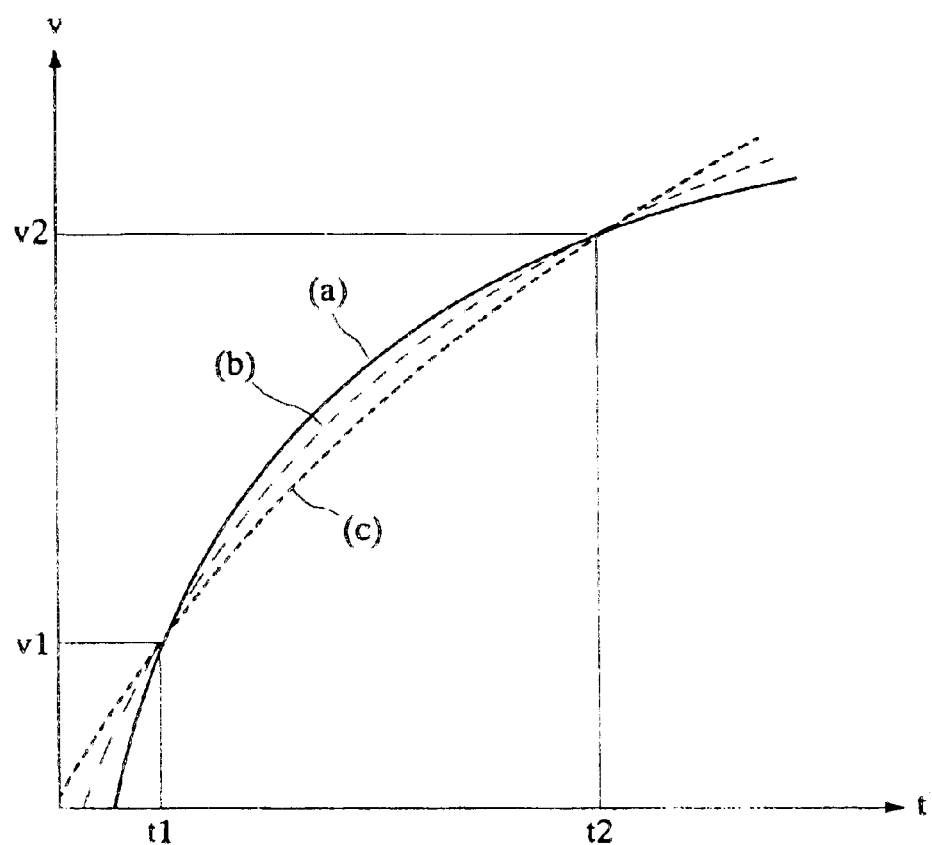
FIG. 4 is a graph showing an example of time-change characteristics of a frequency-modulating voltage signal.

FIG. 4 shows a time-change characteristic of a frequency-modulating voltage signal in the up-modulating interval shown in FIG. 3. In FIG. 4, "v" represents frequency-modulating voltage signal, "t" represents time, and v1 and v2 represent voltages at time t1 and time t2, respectively. The frequency-modulating voltage signal is controlled so as to be expressed in the following expression:

$$v=\alpha(t-t1)(t-t2)+b\cdot t+c$$

where α represents a parameter, and v=b·t+c represents a line passing through the points (t1, v1) and (t2, v2).

Therefore, by changing α, the bulge of a curve passing through two points, (t1, v1) and (t2, v2) changes. In this preferred embodiment, the time-change characteristic of the frequency-modulating voltage signal is set by setting parameter α.

Next, a method for adjusting the characteristic is described below.

Figure 5A:
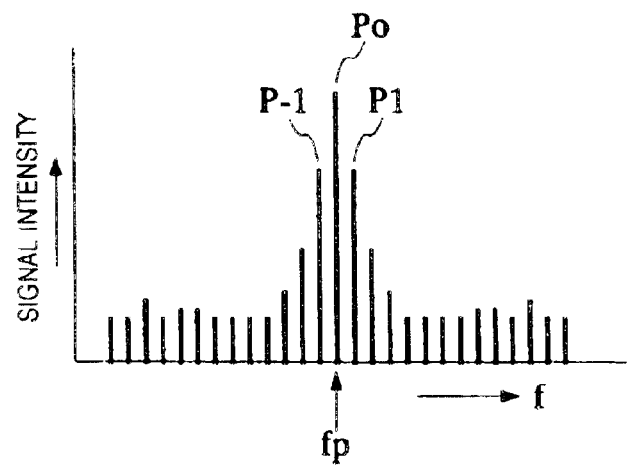
FIGS. 5A, 5B, and 5C are graphs showing examples of changes in frequency spectra caused by adjustment of characteristics.
Figure 5B:
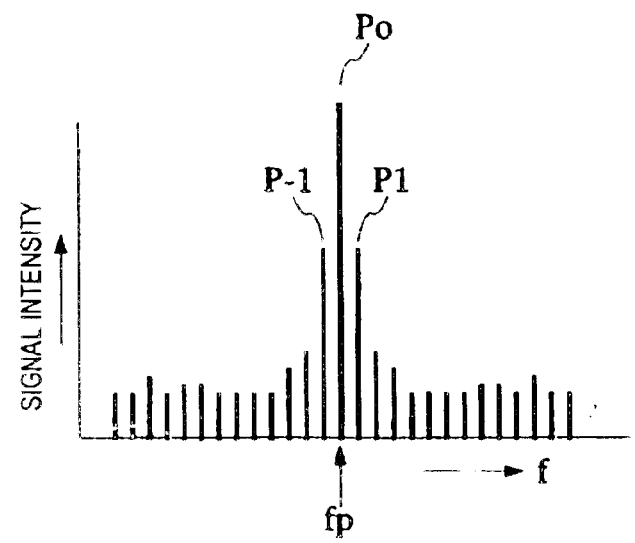
Figure 5C:
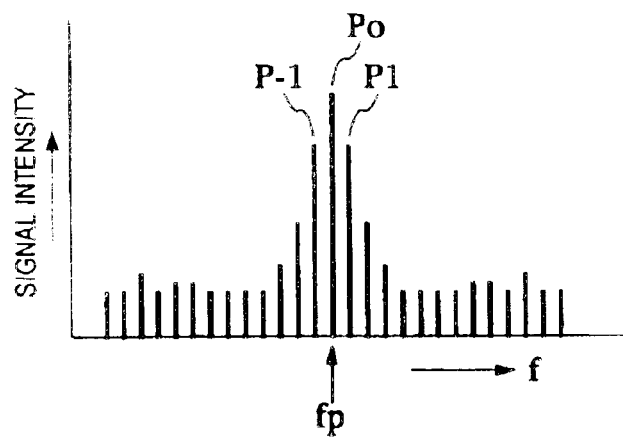

The frequency spectra shown in FIGS. 5A, 5B, and 5C indicate frequency spectra of beat signals caused by reflected waves from a target. FIGS. 5A, 5B, and 5C correspond to time-change characteristics of the frequency-modulating voltage signal which are shown by reference alphabets (a), (b), and (c) in FIG. 4.

In each graph, the horizontal axis indicates the frequency of the beat signal, and the vertical axis indicates signal intensity (power). In this example, in an FFT range bin, a bulge of signal intensity appears around the frequency position denoted by frequency fp. When the time-change characteristic of the frequency-modulating voltage signal is indicated by the curve denoted by reference alphabet (b) in FIG. 4, the signal intensity Po of peak frequency fp is the maximum. The worse the linearity of frequency shifting of the transmitting signal in the up-modulating interval and the down-modulating interval, the greater the bulge of the signal intensity which appears in the frequency spectrum of the beat signal. Conversely, the better the linearity of the frequency shifting, the higher the signal intensity of the peak frequency, so that the sharpness of the bulge of the signal intensity which appears in the frequency spectrum is large. In this example, by using the peak value Po of peak frequency fp, and signal intensity P-1 in a lower range adjacent to the FFT range bin and signal intensity P1 in an upper range bin adjacent to the FFT range bin, evaluation value Ps representing the sharpness of the signal intensity appear in the frequency spectrum.

Here, evaluation value Ps is set as:

$$Ps=Po/(P\text{-}1+Po+P1)$$

By finding parameter α at which evaluation value Ps is the maximum, adjustment is performed.

Figure 6:
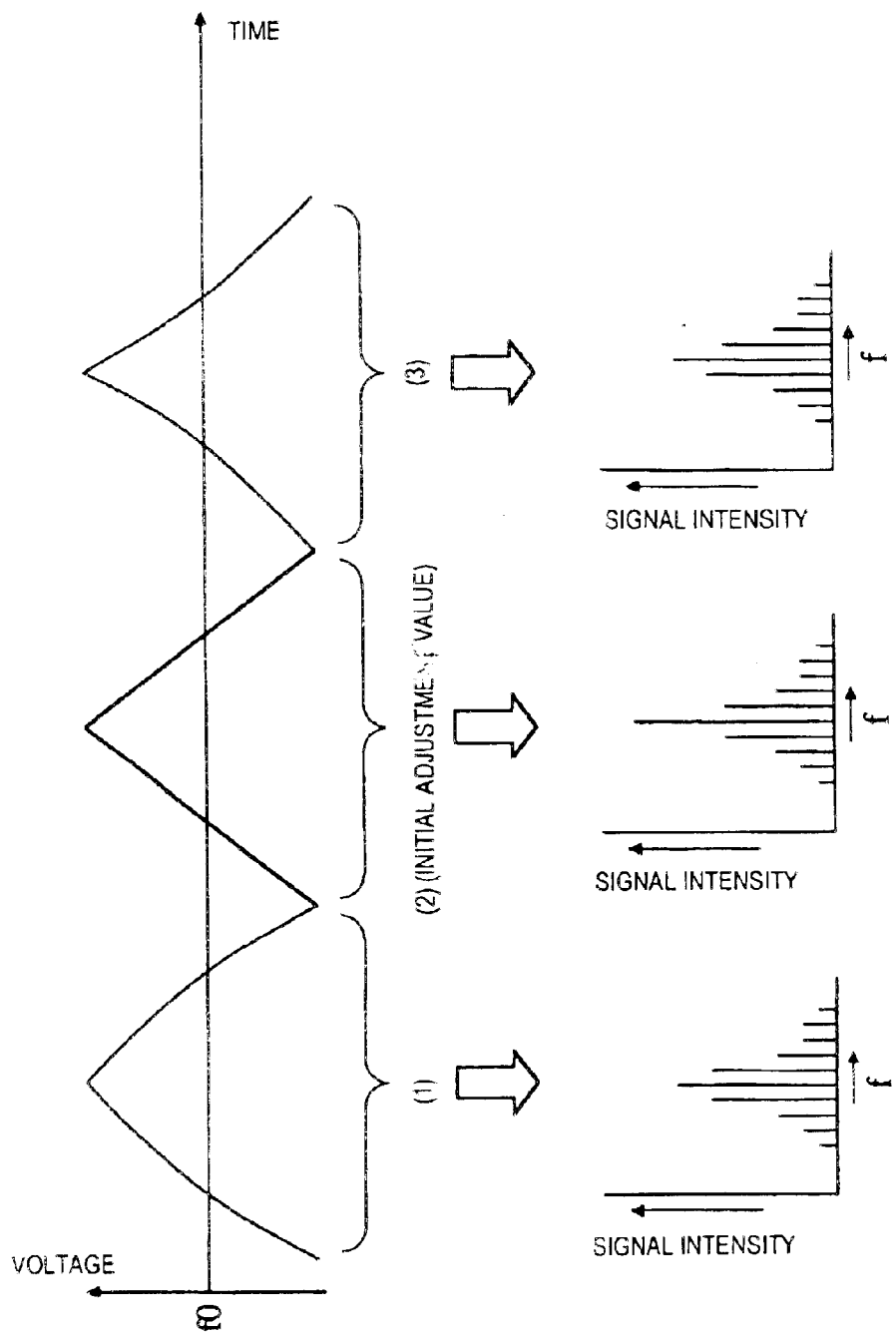
FIG. 6 includes graphs showing time-change characteristics of a frequency-modulating voltage signal caused by adjustment of characteristics and examples of changes in frequency spectra caused thereby of a beat signal.

FIG. 6 shows a case in which the above-described adjustment is performed while performing actual detection of a target. In FIG. 6, reference numeral (2) shows a time-change characteristic of a frequency-modulating voltage signal to the VCO 8 in the present state in which the above-described adjustment has already been performed, and the frequency spectrum of a beat signal generated by the time-change characteristic. By increasing or reducing parameter α from this state by a minute amount, the time-change characteristic of the frequency-modulating voltage signal to the VCO 8 and the frequency spectrum of the beat signal caused by the time-change characteristic are changed as shown by reference numerals (1) and (3) in FIG. 6. In the case in FIG. 6, the state shown by reference numeral (2) of an initial adjustment value is optimal. An increase or decrease in parameter α from this state reduces the sharpness of the bulge of the signal intensity in the frequency spectrum. Accordingly, in the state shown in FIG. 6, parameter α is continuously maintained with the initial adjustment value unchanged.

Figure 7:
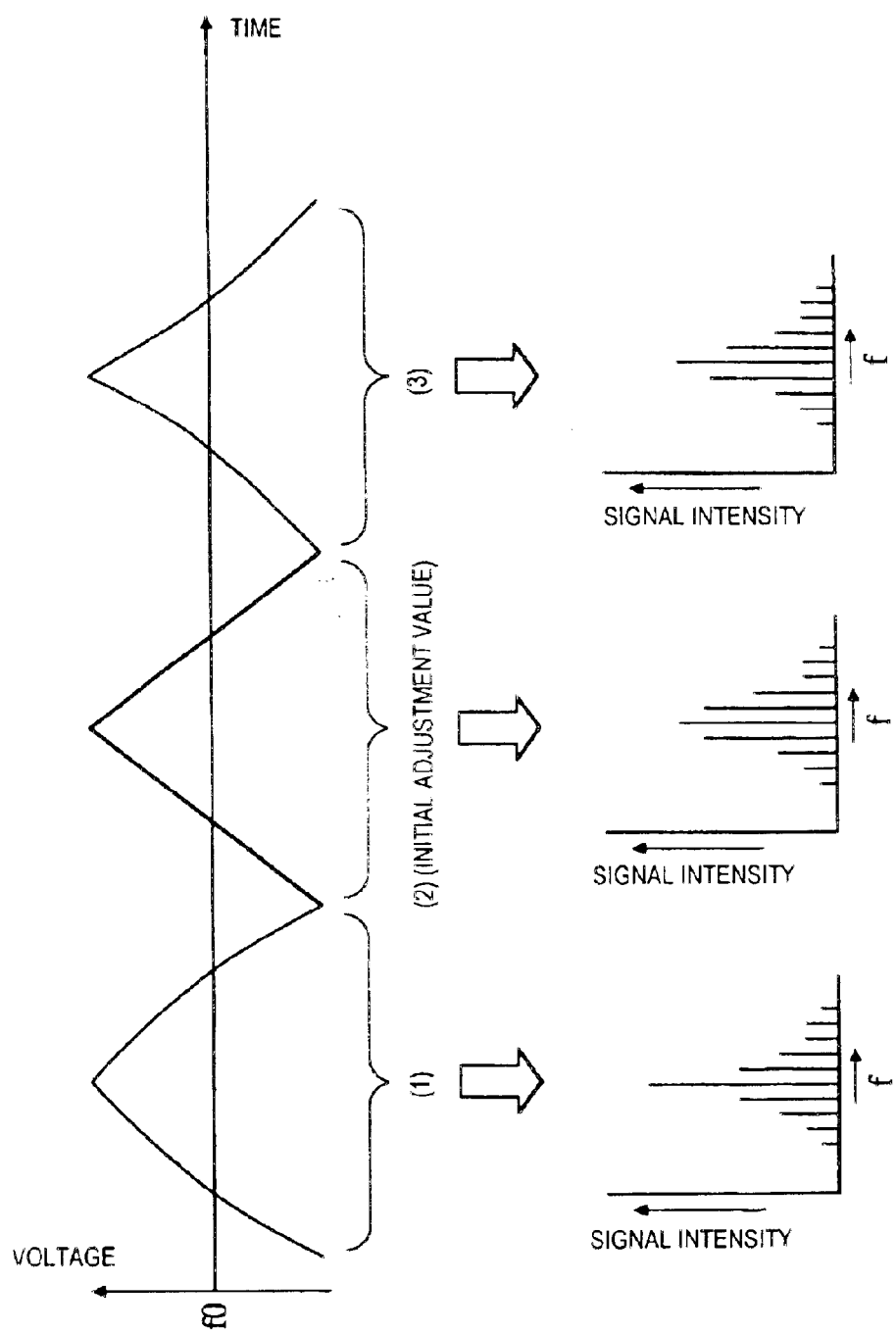
FIG. 7 includes graphs showing time-change characteristics of a frequency-modulating voltage signal caused by adjustment of characteristics and examples of changes in frequency spectra caused thereby of a beat signal.

In the case shown in FIG. 7, similarly to the above-described case, when the parameter α is increased by a minute amount, as shown by reference numeral (1), the bulge of signal intensity included in a frequency spectrum is sharper than that of the state shown by reference numeral (2). Accordingly, in this case, by increasing the parameter α, adjustment is performed so that the characteristic shown by reference numeral (1) can be obtained.

Figure 8:
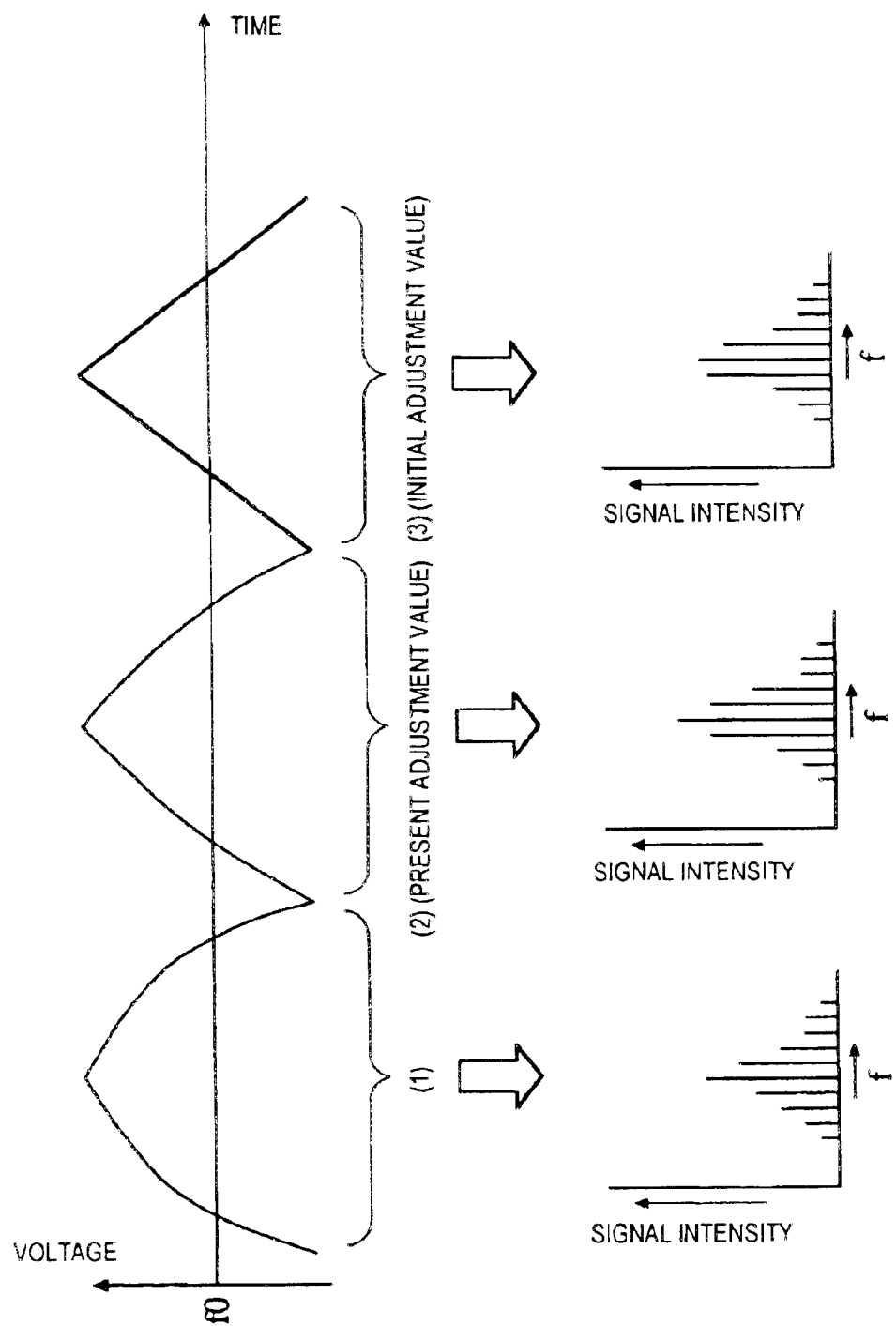
FIG. 8 includes graphs showing time-change characteristics of a frequency-modulating voltage signal caused by adjustment of characteristics and examples of changes in frequency spectra caused thereby of a beat signal.

Also, in the case shown in FIG. 8, when the state of the present adjustment value shown by reference numeral (2) is changed into the state shown by reference numeral (1) by increasing the parameter α by a minute amount, the bulge of signal intensity included in the frequency spectrum of the beat signal becomes sharper. However, when the parameter α in the state of the initial adjustment value exceeds a predetermined allowed value, it is determined that time change of the VCO 8 progresses, making it impossible to obtain predetermined characteristics at an early stage. Then, a warning is sent out.

Next, a process of the MPU 15 which corresponds to a time-change-characteristic adjustment unit and warning output unit according to a preferred embodiment of the present invention is described below with reference to the flowchart shown in FIG. 9.

The present parameter α1 is increased by minute amount Δα to generate a new parameter and a time-change characteristic of the frequency-modulating voltage signal to the VCO 8 is set. In this state, the evaluation value Psp on the sharpness of a bulge of signal intensity in frequency spectrum is calculated (step s1). Next, an evaluation value Ps is calculated, with the parameter α unchanged at the presently set parameter α1 (step s2). Also, in a state obtained by reducing the parameter α from the present parameter α1 by minute amount Δα, the evaluation value Ps is calculated (step s3). After that, the evaluation values Ps, Psn, and Psp are compared in magnitude with one another. If the evaluation value Ps is not less than the evaluation value Psn and not less than the evaluation value Psp (steps s4 and s6), the present parameter α1 is regarded as optimal, and the process directly ends ("END").

If Psn>Ps, a new parameter α1 is set to α1−Δα (step s5). If Psp>Ps (step s6), a new parameter α1 is set to α1+Δα (step s7).

After that, the absolute value of the difference between the presently set α1 and the initial parameter α0 as an adjustment value in an initial state such as a state in shipment from the factory is compared in magnitude with the predetermined threshold value $\alpha_{err}$. If the absolute value of the difference exceeds the threshold value $\alpha_{err}$ (step s8), it is determined that the time change has progressed, and a warning is sent to an upper system (e.g., a host apparatus to which the radar system is connected) (step s9). This causes the host apparatus to display, on its display unit, a warning indicating that the life of the VCO 8 has expired or that the VCO 8 is coming to life.

Figure 9:
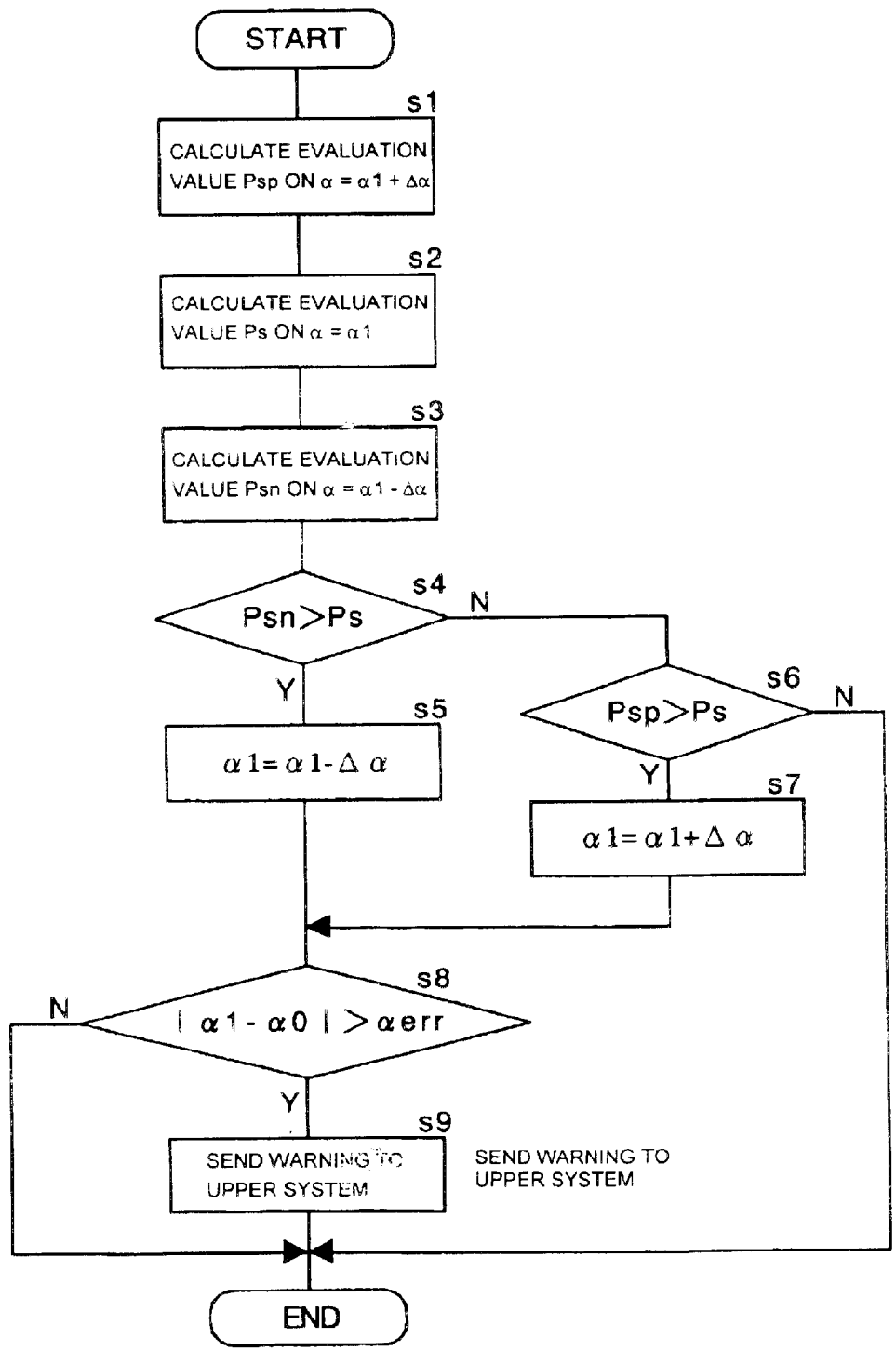
FIG. 9 is a flowchart showing a characteristic adjustment process.

The adjustment process in FIG. 9 may periodically be performed or may be performed at random times since it can be performed when a normal detection operation is performed, if necessary. For example, it may be performed at regular time intervals after the supply of power or may be performed in an initial process after the supply of power.

It should be understood that the foregoing description is only illustrative of the present invention. Various alternatives and modifications can be devised by those skilled in the art without departing from the present invention. Accordingly, the present invention is intended to embrace all such alternatives, modifications and variances which fall within the scope of the appended claims.

What is claimed is:

1. A radar system comprising:
    a transmitting/receiving unit for transmitting, by supplying a frequency-modulating voltage signal to a voltage-controlled oscillator for determining a transmitting frequency, a transmitting signal in which an up-modulating interval having an upwardly shifting frequency and a down-modulating interval having a downwardly shifting frequency are alternately repeated, and for receiving a reflected signal from a target;
    a frequency-analyzing unit for finding data concerning the frequency spectrum of a beat signal based on the transmitting signal and the received signal;
    a detected-data extracting unit for extracting, based on the beat signal in the up-modulating interval and the beat signal in the down-modulating interval, at least one of a relative distance to said target and a relative speed of said target; and
    a time-change-characteristic adjustment unit for finding an evaluation value for evaluating the linearity of a frequency change in the transmitting signal from the result of the analysis performed by said frequency-analyzing unit, with a time-change characteristic of the frequency-modulating voltage signal changed by a minute amount, and for adjusting the time-change characteristic so that the evaluation value is optimal.

2. A radar system according to claim 1, further comprising a warning output unit for outputting a warning when the amount for optimizing the evaluation value of adjusting the time-change characteristic of the frequency-modulating voltage signal exceeds a predetermined value.

3. A radar system according to claim 1, wherein the time-change characteristic of the frequency-modulating voltage signal is expressed by a polynomial of at least a second order, and the time-change characteristic of the frequency-modulating voltage signal is adjusted by changing the coefficient of each term of the polynomial.

4. A radar system according to claim 1, wherein the time-change characteristic is adjusted during actual use of the radar system.

5. A radar system according to claim 1, wherein the time-change-characteristic adjustment unit adjusts the time-change characteristic during a normal target-detection operation performed by the radar system.

6. A radar system according to claim 1, wherein the transmitting/receiving unit comprises a radio frequency block.

7. A radar system according to claim 1, wherein the frequency-analyzing unit comprises a digital signal processor.

8. A radar system according to claim 1, wherein the detected-data extracting unit comprises a microprocessor unit.

9. A radar system according to claim 1, wherein the time-change characteristic adjustment unit comprises a microprocessor unit.

10. A radar system according to claim 2, wherein the warning output unit comprises a microprocessor unit.

11. A radar system according to claim 1, further comprising a radio frequency block and a signal processing block, wherein the frequency-analyzing unit is provided in the radio frequency block.

12. A radar system according to claim 1, further comprising a radio frequency block and a signal processing block, wherein the detected-data extracting unit is provided in the radio frequency block.

13. A radar system according to claim 1, further comprising a radio frequency block and a signal processing block, wherein the time-change characteristic adjustment unit is provided in the radio frequency block.

14. A radar system according to claim 2, further comprising a radio frequency block and a signal processing block, wherein the warning output unit is provided in the radio frequency block.

15. A method of operating a radar system, comprising the steps of:
    supplying a frequency-modulating voltage signal to a voltage-controlled oscillator for determining a transmitting frequency to transmit a transmitting signal in which an up-modulating interval having an upwardly shifting frequency and a down-modulating interval having a downwardly shifting frequency are alternately repeated, and receiving a reflected signal from a target;
    determining and frequency-analyzing data concerning the frequency spectrum of a beat signal based on the transmitting signal and the received reflected signal;
    extracting, based on the beat signal in the up-modulating interval and the beat signal in the down-modulating interval, at least one of a relative distance to said target and a relative speed of said target; and
    adjusting a time-change-characteristic by finding an evaluation value for evaluating the linearity of a frequency change in the transmitting signal from the result of the determining and frequency-analyzing step, with a time-change characteristic of the frequency-modulating voltage signal changed by a minute amount, and adjusting the time-change characteristic so that the evaluation value is optimal.

16. The method according to claim 15, further comprising the step of outputting a warning when the amount for optimizing the evaluation value of adjusting the time-change characteristic of the frequency-modulating voltage signal exceeds a predetermined value.

17. The method according to claim 15, wherein the time-change characteristic of the frequency-modulating voltage signal is expressed by a polynomial of at least a second order, and the time-change characteristic of the frequency-modulating voltage signal is adjusted by changing the coefficient of each term of the polynomial.

18. The method according to claim 15, wherein the time-change characteristic is adjusted during actual operation of the radar system.

19. The method according to claim 15, wherein the time-change-characteristic is adjusted during a normal target-detection operation performed by the radar system.

* * * * *